Dec. 28, 1965  D. TIJUNELIS  3,226,459
QUENCHING OF POLYOLEFIN FILM
Filed Oct. 3, 1962
FIG. 1
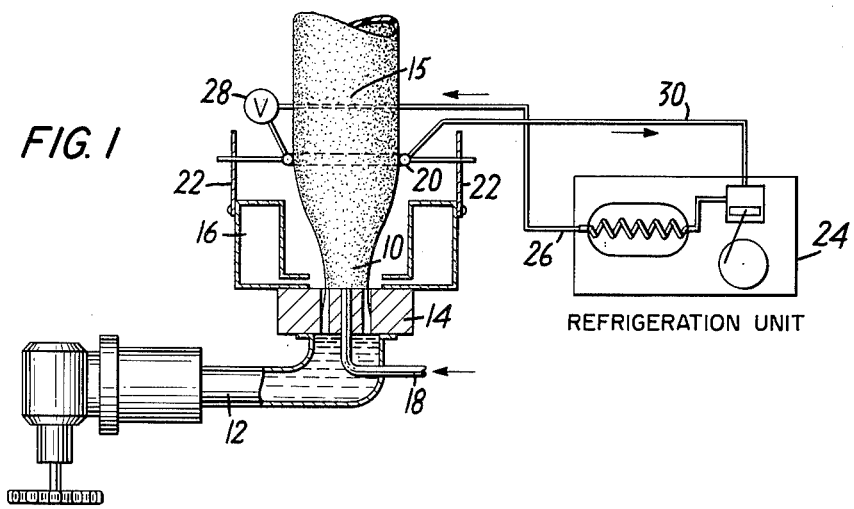
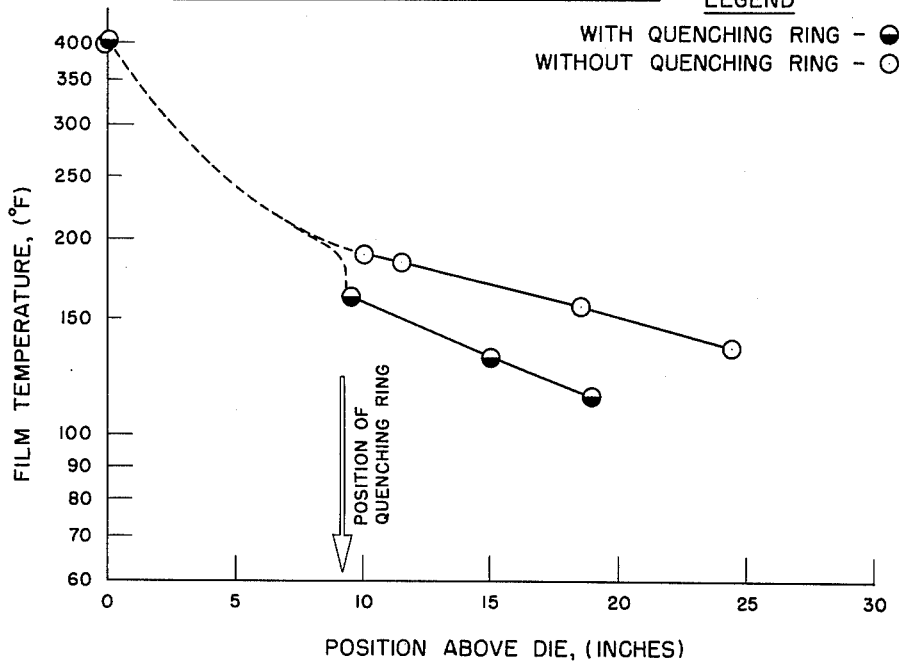
FIG. 2
INVENTOR.
DONATAS TIJUNELIS
BY
ATTORNEY

United States Patent Office 3,226,459
Patented Dec. 28, 1965

3,226,459
QUENCHING OF POLYOLEFIN FILM
Donatas Tijunelis, Chicago, Ill., assignor to Union Carbide Corporation, a corporation of New York
Filed Oct. 3, 1962, Ser. No. 228,039
8 Claims. (Cl. 264—95)

The present invention relates generally to the quenching of polyolefin film and, more particularly, to a novel quenching process for improving the optical properties of polyolefin film.

The term "olefin polymers" is used in the present specification and claims to denote normally solid homopolymers of alpha mono-olefinically unsaturated hydrocarbons as well as normally solid copolymers thereof, with one or more other organic compounds copolymerizable therewith which contain polymer producing unsaturation, such as is present for example in carbon monoxide and formaldehyde and in compounds containing the ethylene linkage >C=C<, e.g., styrene, vinyl stearate, butene, vinyl acetate, vinyl formate, methyl acrylate, monobutyl maleate, 2-ethyl hexyl acrylate, N-methyl-N-vinyl acetamide, acrylic acid, ethyl acrylate, methacrylic acid, isoprene, butadiene, acrylamide, vinyl triethoxysilane, bicycloheptene, bicycloheptadicene, divinyl phosphonate and the like. Many other copolymerizable monomers which can be used in addition to these illustrative compounds are well known to the art.

Heretofore, it has been discovered that the clarity, gloss, and other properties of extruded polyolefin films can be improved by cooling the film immediately after it has left the extruding die. Also, a number of processes and apparatus have been proposed for cooling the film so as to achieve the desired effects. In the case of the extrusion of tubular film, the most popular cooling device is an air ring which is spaced concentrically with and a small distance away from the tube to be cooled and blows cooled air onto the film. However, the cooling of the film by air is often too gradual to achieve the optimum optical properties in the film. It has also been proposed to cool the film by passing it through a liquid bath, but such processes are generally cumbersome and inflexible and require a considerable amount of attention from an operator. In order to achieve higher film throughputs and to improve the optical and other properties of the film, it is desirable to have a process which increases the cooling rate of the film beyond that attainable with blown air and without the inconveniences and limitations asociated with a liquid bath.

It is, therefore, the main object of the present invention to provide a process for cooling extruded film immediately after extrusion and at an increased cooling rate.

It is another object of the invention to provide a process for improving the optical properties of extruded polyolefin film.

Other aims and advantages of the invention will be apparent from the folowing description and appended claims.

In the drawings:
FIG. 1 is an elevation view, partially in section, of a preferred embodiment of the present invention and a schematic diagram of a refrigeration system employed therein; and FIG. 2 is a graph showing temperature profiles of polyolefin films treated with and without the use of the present invention.

In accordance with the present invention, there is provided a process for producing a polyolefin film having improved optical properties comprising extruding an olefin polymer through an extrusion die so as to form a film thereof; passing the extruded film over a solid cooling surface located between the extrusion die and the frost line of the film; and providing lubrication between the film and the cooling surface by maintaining the cooling surface at a temperature below the dew point of the surrounding atmosphere so that moisture condenses on the surface from the atmosphere.

Although the use of solid cooling surfaces to quench extruded films by conductive cooling has been known heretofore, no effective means has ever been proposed for providing lubrication between such surfaces and the film being cooled thereby. In the present invention, the solid cooling surface is maintained at a temperature below the dew point of the surrounding atmosphere so that moisture is condensed from the atmosphere onto the cooling surface to provide lubrication between the cold surface and the film. In the preferred form of the invention, the cooling surface is maintained at a temperature below the freezing point of the condensing moisture, so that a lubricating layer of frost is formed thereon.

In order to improve the optical and other properties of the extruded film, the solid cooling surface is located between the extrusion die and the frost line of the film. The term "frost line" in tubular extrusion is used to designate the point at which as the film cools it reaches the transition between the molten state or region of higher molecular mobility and the solid state or region of low molecular mobility. The frost line is a well known phenomenon in the art of film extrusion and can usually be observed in the cooling film. In addition to improving the optical properties of the extruded film, the extremely rapid conductive cooling achieved by the present invention makes it possible to operate at relatively high throughput rates.

A preferred embodiment of the present invention will now be described in greater detail by referring to the drawings.

Referring now to FIG. 1, an olefin polymer is extruded from an extruder 12 through an annular extrusion die 14 so as to form a seamless tube 10. As the seamless tube 10 leaves the extrusion die 14, it is expanded or inflated by pressurized gas, such as air, introduced through a tube 18 in the die 14. This is the well known blown tube method of extrusion.

From the die 14, the extruded tube 10 is withdrawn upwardly through a conventional air ring 16 mounted just above the die 14, and then on up through a metal cooling ring 20 mounted on supporting members 22 fastened to the upper edge of the air ring 16. The air ring 16 not only serves as a preliminary cooling means for the extruded tube 10, but also serves as a means for supplying air having the desired relative humidity to the region around the cooling ring 20. In other words, the relative humidity of the atmosphere around the cooling ring 20 may be controlled by controlling the relative humidity of the air that is supplied to and ejected by the air ring 16.

The cooling ring 20 is made of copper or any other suitable metal having a high thermal conductivity. The inside diameter of the ring 20 should be about the same as the outside diameter of the expanded tubular film 10 so that the entire outer periphery of the tubular film rubs against the layer of condensed moisture formed on the inner periphery of the cold ring 20. As illustrated in FIG. 1, the cooling ring 20 must be located between the extrusion die 14 and the frost line 15 of the extruded film, but preferably far enough away from the die 14 to permit full expansion of the film before it contacts the ring 20. It is important in the inventive process that the cooling ring 20 be maintained at a temperature below the dew point of the surrounding atmosphere so that moisture is condensed from the atmosphere onto the cooling surface to provide a film of lubricating moisture thereon. It is preferred to maintain the ring 20 sufficiently low to freeze the condensing moisture. Of course, the dew point of the atmosphere surrounding the ring 20 depends on the relative humidity and temperature of the atmosphere in any given situation, but, as explained above, the relative humidity may be controlled by adjusting the amount of moisture in the air ejected by the air ring 16. In general, it is preferred to operate with air in the vicinity of the cooling ring having a dew point of at least about 0° C. In any event, additional moisture can always be condensed on the ring 20 by simply reducing the temperature of the ring.

A suitable refrigeration system for the cooling ring 20 is shown schematically in FIG. 1. Referring to FIG. 1, a suitable refrigerant is passed from a conventional refrigeration unit 24 through a line 26 into an expansion valve 28. From the expansion valve 28, the refrigerant is passed into the ring 20 where it removes heat from the walls of the ring. The refrigerant is then discharged from the ring 20 through a line 30 and recycled back into the refrigeration unit 24.

In various examples of the present invention, several different polyethylene and polypropylene resins were melt extruded upwardly by the conventional blow tube method through a die having an annular opening 2.5 inches in diameter and 0.021 inch wide. The extruded tube was immediately blown to a flat width of about 9.5 inches. The die temperature was 400° F. A conventional assembly for externally cooling tubular film with air was mounted just above the die opening, and on top of the air cooling assembly was mounted a cooling ring of 3/8-inch copper tubing. The air cooling assembly was supplied with humidified air in order to increase the relative humidity of the air around the copper cooling ring. The copper cooling ring had an inside diameter of about 6 3/16 inches, which was about the same as that of the blown tubing, and was located 9.5 inches above the upper surface of the die, i.e., below the frost line of the extruded tube. The copper ring was connected through an automatic expansion valve to a 1/6-horsepower Copeland refrigeration unit, using Freon-12 as the refrigerant, which maintained the ring at a temperature of about 0° F., which was below the dew point of the surrounding atmosphere. The tubular film was withdrawn upwardly through the copper cooling ring at a speed of 10 to 13 feet per minute. Under these conditions, the refrigerated copper ring was continually covered with a film of condensed moisture which provided lubrication between the film and inner surface of the cooling ring. After each run, a control run was made under the same conditions but without the copper cooling ring. In each case, the resulting film was tested for impact, total haze, internal haze, gloss, transparency and thickness. The results of these tests for three different resins are shown in the following table:

haze were reduced, and the impact strength and gloss of the resulting film were increased.

The temperature profiles of the two runs with the first polyethylene sample listed in the above table (density of 0.92) are shown in FIG. 2 of the drawings. Referring to FIG. 2, the upper curve represents the run made without the copper cooling ring, while the lower curve represents the run made with the cooling ring. As can be seen from a comparison of the two curves, the temperature of the film was reduced quite sharply as it was brought into contact with the cooling ring. It is believed that this sharp drop in temperature accounts for the improved properties indicated in the above table.

While a presently preferred embodiment of the present invention has been described herein in some detail, it will be understood that the same is susceptible of numerous modifications and changes. For example, although the invention has been described with particular reference to the extrusion of tubular films, it is equally applicable to the extrusion of film in other forms, such as flat sheets. Also any of the conventional additives, such as stabilizers, lubricants, antioxidants, dyestuffs, fillers, slip agents, antiblocking agents, anti-fog agents, anti static agents, and the like may be added to the particular olefin polymer employed in their usual quantities.

The following tests were used to determine the various properties referred to herein:

Impact—Modern Packaging 25, 129 (November 1951), measured in inch-lbs./min.

Total haze—A.S.T.M. D 1003-52.

Gloss—A.S.T.M. 523-53T.

Density—A.S.T.M. D 1248-58T.

Melt index—A.S.T.M. D 1238-52T.

Internal haze—The internal haze is measured using the same apparatus as that in the haze measurement of A.S.T.M. D 1003-52. The method is modified as follows. The piece of the film is placed between glass plates of a thickness of 1/16 inch. A drop of anisole is placed in the interface between the film and the glass (both sides). The haze is thereafter measured according to the A.S.T.M. D 1003-52 method. The haze of the glass-anisole without the film is determined by the same method. The internal haze of the film is obtained by subtracting the haze value of the glass-anisole combination from the haze value of the glass-anisole-film combination Transparency test—Transparency rating is the maximum distance in inches at which a standard eye chart can be read through a film under the following conditions. The film is clamped to a 6-inch diameter hoop, without stretching, so that there are no wrinkles. The hoop is placed in a slot in the visual distortion apparatus with the machine direction of the film in a vertical direction. The eyes of the operator are approximately 12 inches from the film. The eye chart (A.M.A. reading card, Form NV-3M-7-54, lines 14/89 and 14/224) is moved slowly from back to front until all of the large letters can be read. The distance in inches of the eye chart from the film is record-

TABLE I

|  | Polyethylene #1 | | Polyethylene #2 | | Polypropylene | |
| --- | --- | --- | --- | --- | --- | --- |
|  | Without Ring | With Ring | Without Ring | With Ring | Without Ring | With Ring |
| Impact (in-#) (mil) | 13.0 | 24.0 | 8.8 | 12.4 | 1.64 | 14.4 |
| Total Haze, (percent) | 10.6 | 6.9 | 9.4 | 2.0 | 54.3 | 27.4 |
| Internal Haze, (percent) | 3.6 | 0.4 | 3.8 | 0.5 | *23.0 | *7.9 |
| Gloss, (percent) | | | 72 | 89 | 10.6 | 35.1 |
| Transparency, (in): | | | | | | |
| Large | | | | | 4.05 | 24.9 |
| Small | | | | | 1.65 | 7.6 |
| Thickness, (mils) | 4.0 | 4.0 | 3.3 | 3.3 | 3.0 | 3.2 |

*Determined by the test method for polyethylene.

As can be seen from the data in the above table, the use of the refrigerated copper cooling ring resulted in significant film property improvement. Both total and internal ed. With the film still in position, the procedure is repeated viewing the small letters on the eye chart. To convert small letter readings to large letter readings, multiply small letter readings by a factor of 2.2. If maximum readings are achieved with both large and small letters, the results are recorded as >266 (>120.9×2.2).

What is claimed is:
1. A process for producing a polyolefin film having improved optical properties comprising:
    (a) extruding an olefin polymer through an extrusion die so as to form a film thereof;
    (b) passing the extruded film over a solid cooling surface located between said extrusion die and the frost line of said film;
    (c) maintaining the dew point of the atmosphere surrounding said solid cooling surface at at least 0° C. by supplying humid air to the region around said solid cooling surface; and
    (d) providing lubrication between said film and said cooling surface by maintaining said cooling surface at a temperature below the dew point of the surrounding atmosphere so that moisture condenses on said surface from said atmosphere.
2. The process of claim 1 wherein said solid cooling surface is maintained at a temperature below the freezing point of the moisture condensing thereon.
3. The process of claim 1 wherein said film is extruded as a seamless tube.
4. The process of claim 1 wherein said solid cooling surface is a thermally conductive metal.
5. The process of claim 1 wherein said olefin polymer is polyethylene.
6. The process of claim 1 wherein said olefin polymer is polypropylene.
7. A process for producing a polyolefin film having improved optical properties comprising:
    (a) extruding an olefin polymer through an extrusion die so as to form a seamless tube;
    (b) passing said seamless tube through an air ring;
    (c) expanding said tube by the application of internal gas pressure;
    (d) passing the expanded tube through a metal cooling ring located between said extrusion die and the frost line of said tube;
    (e) maintaining the dew point of the atmosphere surrounding said solid cooling surface at at least 0° C. by supplying humid air to the region around said solid cooling surface by means of said air ring; and
    (f) providing lubrication between said film and said cooling ring by maintaining said ring at a temperature below the dew point of the atmosphere surrounding said ring so as to form a layer of condensed moisture on the surface of said ring, the entire outer periphery of said tube passing in contact with said layer of moisture on said ring.
8. Apparatus for producing a polyolefin film having improved optical properties comprising:
    (a) means for extruding an olefin polymer through an extrusion die so as to form a seamless tube;
    (b) means for expanding said tube by the application of internal gas pressure;
    (c) an external metal cooling ring located between said extrusion die and the frost line of said tube;
    (d) means for passing the expanded tube through said cooling ring;
    (e) means for maintaining said cooling ring at a temperature below the dew point of the surrounding atmosphere so that a layer of condensed moisture is formed on the surface of said ring to provide lubrication between said film and said ring; and
    (f) air ring means located between said extrusion die and said cooling ring for supplying humid air to the region around said cooling ring to maintain the dew point of the atmosphere surrounding said cooling ring at at least 0° C.

References Cited by the Examiner

UNITED STATES PATENTS

| | | | |
|---|---|---|---|
| 2,251,785 | 8/1941 | Dons et al. | 264—28 |
| 2,354,744 | 8/1944 | Dreyfus | 264—28 |
| 2,452,884 | 10/1948 | Werner | 264—178 |
| 2,461,975 | 2/1949 | Fuller | 264—95 |
| 2,955,321 | 10/1960 | Fortner et al. | 18—57 XR |
| 2,963,742 | 12/1960 | Ahlich et al. | 18—14 |
| 3,008,185 | 11/1961 | Goldman | 18—57 XR |
| 3,061,876 | 11/1962 | Lloyd et al. | 264—95 |
| 3,087,390 | 4/1963 | Ruza | 18 |
| 3,125,619 | 3/1964 | Miller | 264—348 |
| 3,144,494 | 8/1964 | Gerow | 264—95 |

FOREIGN PATENTS

| | | |
|---|---|---|
| 153,610 | 10/1953 | Australia. |
| 223,196 | 11/1957 | Australia. |
| 741,962 | 12/1955 | Great Britain. |

ALFRED L. LEAVITT, *Primary Examiner.*

ALEXANDER H. BRODMERKEL, *Examiner.*